United States Patent [19]

El-Sherbini

[11] Patent Number: 4,631,521

[45] Date of Patent: Dec. 23, 1986

[54] METHOD AND APPARATUS FOR DIFFERENTIAL RUN-LENGTH CODING

[75] Inventor: Ahmed M. El-Sherbini, Giza, Egypt

[73] Assignee: Wang Laboratories, Inc., Lowell, Mass.

[21] Appl. No.: 687,629

[22] Filed: Dec. 31, 1984

[51] Int. Cl.$^4$ .................... H03K 13/22; H04N 1/00
[52] U.S. Cl. ........................... 340/347 DD; 358/260
[58] Field of Search ............... 340/347 DD; 358/260, 358/261

[56] References Cited

U.S. PATENT DOCUMENTS

| | | | |
|---|---|---|---|
| 3,967,052 | 6/1976 | Judice | 358/261 X |
| 4,005,411 | 1/1977 | Morrin, II | 340/347 DD |
| 4,086,620 | 4/1978 | Bowen et al. | 358/260 |
| 4,215,375 | 7/1980 | Usubuchi et al. | 358/261 |
| 4,542,411 | 9/1985 | Imanaka et al. | 358/260 |

Primary Examiner—William M. Shoop, Jr.
Assistant Examiner—Sharon D. Logan
Attorney, Agent, or Firm—Michael H. Shanahan; Gregory P. Gadson

[57] ABSTRACT

A method and apparatus for data compression in a digital imaging process is disclosed. More specifically a method is disclosed whereby a more efficient reduction of memory space is obtained when a dithered image is of the so called "grey scale" type. The binary bits representing the pixels of the dithered image are differentiated to obtain groups of ones or zeros, so that these groups may be represented by a code, thereby saving memory space. One embodiment uses the Exclusive OR function in the differentiation process.

22 Claims, 15 Drawing Figures

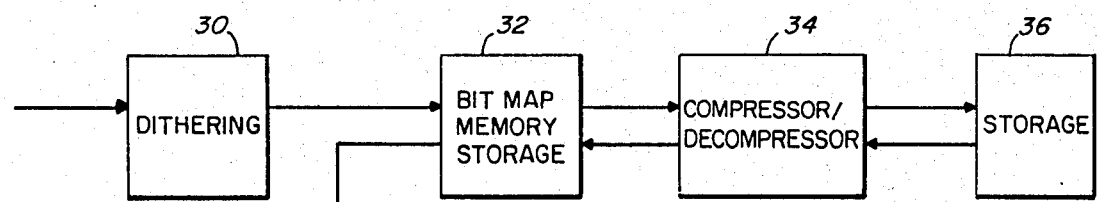
FIG. 2
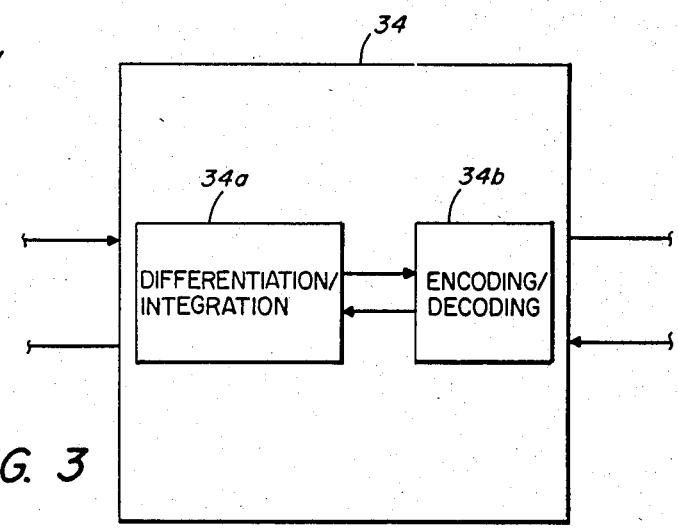
FIG. 3
BAYER'S ORDERED DITHER ALGORITHM
$$\begin{bmatrix} 0 & 32 & 8 & 40 & 2 & 34 & 10 & 42 \\ 48 & 16 & 56 & 24 & 50 & 18 & 58 & 26 \\ 12 & 44 & 4 & 36 & 14 & 46 & 6 & 38 \\ 60 & 28 & 52 & 20 & 62 & 30 & 54 & 22 \\ 3 & 35 & 11 & 43 & 1 & 33 & 9 & 41 \\ 51 & 19 & 59 & 27 & 49 & 17 & 57 & 25 \\ 15 & 47 & 7 & 39 & 13 & 45 & 5 & 37 \\ 63 & 31 & 55 & 23 & 61 & 29 & 53 & 21 \end{bmatrix}$$
FIG. 4

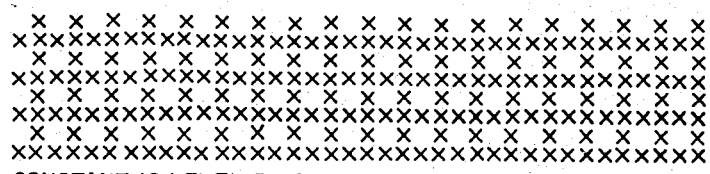
CONSTANT 16 LEVEL BRIGHTNES
FIG. 7a
CONSTANT 48 LEVEL BRIGHTNESS
FIG. 7b
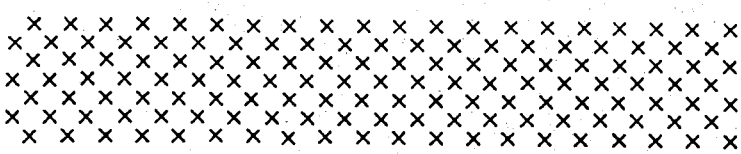
CONSTANT 32 LEVEL BRIGHTNESS
FIG. 7c
```
1 0 1 0 1 0 1 0 1 0 1 0 1 0 1 0 1 0 1 0 1 0 1 0
0 0 0 0 0 0 0 0 0 0 0 0 0 0 0 0 0 0 0 0 0 0 0 0
1 0 1 0 1 0 1 0 1 0 1 0 1 0 1 0 1 0 1 0 1 0 1 0
0 0 0 0 0 0 0 0 0 0 0 0 0 0 0 0 0 0 0 0 0 0 0 0
```
CONSTANT 16 LEVEL BRIGHTNES
FIG. 8a
```
1 1 1 1 1 1 1 1 1 1 1 1 1 1 1 1 1 1 1 1 1 1 1 1
0 1 0 1 0 1 0 1 0 1 0 1 0 1 0 1 0 1 0 1 0 1 0 1
1 1 1 1 1 1 1 1 1 1 1 1 1 1 1 1 1 1 1 1 1 1 1 1
0 1 0 1 0 1 0 1 0 1 0 1 0 1 0 1 0 1 0 1 0 1 0 1
```
CONSTANT 48 LEVEL BRIGHTNESS
FIG. 8b
```
1 0 1 0 1 0 1 0 1 0 1 0 1 0 1 0 1 0 1 0 1 0 1 0
0 1 0 1 0 1 0 1 0 1 0 1 0 1 0 1 0 1 0 1 0 1 0 1
1 0 1 0 1 0 1 0 1 0 1 0 1 0 1 0 1 0 1 0 1 0 1 0
0 1 0 1 0 1 0 1 0 1 0 1 0 1 0 1 0 1 0 1 0 1 0 1
```
CONSTANT 32 LEVEL BRIGHTNESS
FIG. 8c

```
1 0 1 0 1 0 1 0 0 0 0 0 0 0 0 0 0 0 0 0 0 0 0 0
0 0 0 0 0 0 0 0 0 0 0 0 0 0 0 0 0 0 0 0 0 0 0 0
1 0 1 0 1 0 1 0 0 0 0 0 0 0 0 0 0 0 0 0 0 0 0 0
0 0 0 0 0 0 0 0 0 0 0 0 0 0 0 0 0 0 0 0 0 0 0 0
```
CONSTANT 16 LEVEL BRIGHTNESS

*FIG. 9a*

```
1 1 1 1 1 1 1 1 0 0 0 0 0 0 0 0 0 0 0 0 0 0 0 0
0 1 0 1 0 1 0 1 0 0 0 0 0 0 0 0 0 0 0 0 0 0 0 0
1 1 1 1 1 1 1 1 0 0 0 0 0 0 0 0 0 0 0 0 0 0 0 0
0 1 0 1 0 1 0 1 0 0 0 0 0 0 0 0 0 0 0 0 0 0 0 0
```
CONSTANT 48 LEVEL BRIGHTNESS

*FIG. 9b*

```
1 0 1 0 1 0 1 0 0 0 0 0 0 0 0 0 0 0 0 0 0 0 0 0
0 1 0 1 0 1 0 1 0 0 0 0 0 0 0 0 0 0 0 0 0 0 0 0
1 0 1 0 1 0 1 0 0 0 0 0 0 0 0 0 0 0 0 0 0 0 0 0
0 1 0 1 0 1 0 1 0 0 0 0 0 0 0 0 0 0 0 0 0 0 0 0
```
CONSTANT 32 LEVEL BRIGHTNESS

*FIG. 9c*

METHOD AND APPARATUS FOR DIFFERENTIAL RUN-LENGTH CODING

BACKGROUND OF THE INVENTION

This invention relates generally to a method and apparatus for digital imaging devices and more specifically to compression of binary data representing images or pictures.

Prior art digital imaging systems like the PIC system of Wang Laboratories, Inc. are used to digitize pictures, charts, graphs and other images. In the imaging process the specimen is scanned for brightness and converted to a pattern of light and dark picture elements (pixels).

The pixels are created by comparing the specimen with threshold values and determining the status of the pixel based on whether the brightness of the location in question exceeds the threshold value.

Dithering is an image processing technique which creates a two level picture that gives the illusion of a grey scale (multilevel) picture by appropriately controlling the spatial density of light and dark pixels. The dithering is employed by applying a dither algorithm which consists of a pattern of threshold values in the form of a matrix, varying from the darkest to the brightest to a continuous tone or multilevel picture. The brightness of each pixel is compared with the elements in the dithering matrix, and thresholded accordingly, thus reducing the test specimen to a series of light and dark pixels which are represented by binary numbers.

Because of the large number of pixels required to make an acceptable image, a method of data compression is often used, called run-length encoding. Here, strings of identical binary bits are stored in memory as a code to reduce the number of bits in memory.

However, it has been discovered that run-length encoding works poorly when the continuous tone, or gray scale specimen contains large areas having a high number of alternating light and dark regions all of varying brightness. In these originals, there are no long strings of identical bits which may be encoded to achieve a compression of the image data, i.e., a reduction of the number of bits necessary to represent the image or picture.

SUMMARY

Accordingly, it is a principal object of this invention to devise an efficient method of data compression in a digital imaging system, in order to reduce the required memory space.

It is also a principal object of this invention to devise a feasible method of data compression in a digital imaging system when the image is of the grey scale type (the brightness is in the middle range between that of a dark pixel and a light pixel).

Another object of this invention is to convert grey scale digitized images into a form conducive to the effective use of run-length encoding.

A further object is to compress grey scale images, and decompress said compressed image without any loss of the original image.

Yet another object of this invention is to devise an inexpensive and straightforward method of accomplishing the above objects by combining commercially available components into a novel system.

The foregoing and other objects of the present invention are realized by differentiating the digital binary data representing a dithered image, with one method using the exclusive OR logic gate to accomplish the differentiation. Differentiating the bytes representing gray scale images has the effect of producing long strings of identical bits. The data is then in a form for efficient use of run-length encoding, and is encoded accordingly. When the data is retrieved from memory it is decoded and thereafter integrated by again applying the exclusive OR gate or the like, thereby restoring the compressed data to its original state.

DESCRIPTION OF THE DRAWINGS

The foregoing and other objects and features of the present invention are apparent from the specification, the drawings and the two taken together. The drawings are:

FIG. 2 is a schematic representation of the steps included in the present invention.

FIG. 3 is a more detailed version of the step entitled "compression/decompression" in FIG. 2.

FIG. 4 is a close-up of the pattern of pixels (cells) in a region of a dithered image.

FIGS. 7a, 7b, and 7c are illustrations of example sections of dithered images, with three constant brightness level cases shown.

FIGS. 8a, 8b, and 8c, respectively are illustrations of the binary representation of the dithered images in FIGS. 7a, 7b, and 7c.

FIGS. 9a, 9b, and 9c, respectively, are illustrations of the differentiated versions of the first four lines of each case presented in FIGS. 8a, 8b, and 8c.

THE DESCRIPTION

Digital imaging is a process whereby a visual object or scene is converted to binary bits which control the brightness or reflection density of pixels representing the image.

Figure 1:
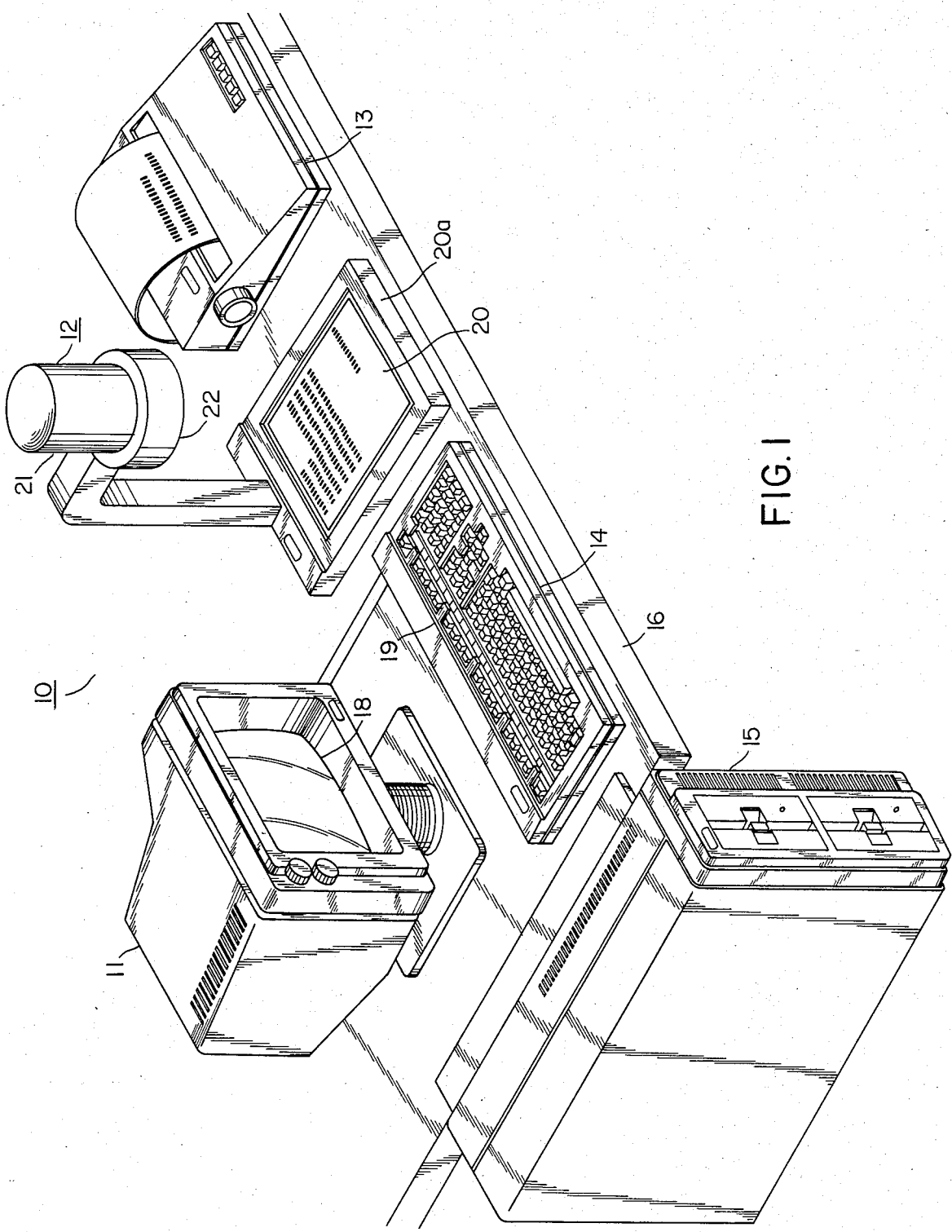
FIG. 1 is is an isometric drawing of an example of a digital imaging system such as may be used in conjunction with the present invention.

In a typical digital imaging system such as shown in FIG. 1, a specimen 20 mounted on a pad 20a, is scanned by a scanner 12, used to detect brightness levels in the picture. The picture is represented by binary numbers by referencing each area representing a pixel to a brightness level (a threshold level). When the brightness of the scanned area exceeds the brightness of the threshold level, the corresponding pixel is turned to the "ON" setting.

If the brightness is less than or equal to the threshold level, the corresponding pixel is turned to the "OFF38 mode.

By scanning the object and thresholding the brightness levels, a binary representation is obtained, which can be stored in memory, displayed on a screen with pixels, or graphically reproduced.

Dithering is a process whereby the digital image is obtained by thresholding the pixel areas in accordance with a pattern, and superimposing the resulting pixels to create an illusion of a multi-level picture. By varying the spatial density of the pixels various levels of brightness are obtained.

Digital images often require a large amount of memory space in order to adequately and accurately represent the object. Accordingly, the prior art discloses methods of replacing the digital image with a series of codes representing groups of pixels. One well known method of compressing the data is to use Huffman run-length encoding described in detail in chapter 5 of *Digital Document Processing*, by Hou, H. S., John Wiley & Sons, New York, 1983, which is hereby expressly incorporated by reference herein.

Dithered images are characteristically full of high spatial frequency components (i.e., frequent alternation between light and dark pixels). As a result there are usually few areas containing pixel uniformity. Here, run-length encoding is of little value in compression of the data, and in extreme cases of high frequency images, run-length encoding may actually increase the data required to represent the image.

It is desirous to convert the data representing a dithered image into a form more conducive to the application of run-length encoding in order to lower the amount of required memory space.

The present invention accomplishes this pre-encoding state by the process of differentiating between each byte in a line of pixels with a reference byte. The invention disclosed is not restricted to any particular byte size, with a byte having as few as one bit or any other number of bits. The presently preferred embodiment is to use a byte size equal to the length or width of the dither pattern which is eight bits.

A digital imaging system such as the PIC system available from Wang Laboratories, Inc., Lowell, MA 01851, is shown in FIG. I supported on Table 16 and is labeled 10. Its major components are a monitor 11, scanner 12, printer 13, keyboard 14, and console 15.

During use, the operation is controlled by the user by operation of the keyboard 14. The user gives instructions to the console 15, which contains a microprocessing unit having several means for controlling the system. The monitor 11 has a screen 18, which the user views while communicating with the system. A further description of system 10 is given in U.S. patent application Ser. No. 440,668, filed Nov. 10, 1982, also assigned to the present assignee, which is hereby expressly incorporated herein by reference.

FIG. 2 shows a schematic representation of the processes comprising the invention. The following steps as illustrated in FIG. 2 are used: the specimen is converted to a dithered (and digitized) image with the dithering means 30 and then stored in a memory means such as bit map 32; the bit map image is compressed with the compressor means 34 and then stored in its compressed state in storage means 36 such as a magnetic disk storage device. Whenever the user desires to print or display the image, it is retrieved from storage element 36, decompressed with decompressor 34, and then placed into a bit map memory 32.

FIG. 3 shows the components for a data compressor (and decompressor). Briefly, the dithered image in the bit map memory 32, is applied to and differentiated by differentiation means 34a (preferably an exclusive OR gate). The output of the differentiation means is applied to the encoding/decoding means 34b where it is stored in an intermediate buffer, if necessary, and is encoded per the Huffman encoding scheme, or some other scheme. The long strings of ones and zeroes are represented by binary words as a result of the encoding. After compression, the data is placed in memory or storage element 36.

During retrieval of the dithered, compressed image, the stored data is retrieved from storage means 36 and then decoded by means 34b. It is then integrated by the differentiating/integrating means 34a to produce the original bit map representation of the image, and then fed back into the bit map memory 32. At this point, the image can be displayed, printed, edited or sent back to storage means 36.

Referring back to FIG. 1 to begin the imaging process, a specimen 20 is placed under the scanner 12. Scanner 12 is comprised of a camera 21 and a lamp 22. The lamp 22 places light onto the specimen 20 which is reflected back to camera 21. Camera 21 takes a succession of pictures of specimen 20, one line at a time. The number of lines and the number of pixels is generally related to the resolution of the image that can be displayed on the screen 18 and or printed on printer 13.

Dithering is accomplished by comparing each pixel of the specimen photographed by the camera 12 with a number representing a unique value of intensity. The values range from a level equal to the intensity of a pixel in the "OFF" state to a pixel in the "ON" state. These values are considered threshold values because when the intensity of the corresponding area of the specimen is greater than the intensity of the compared value, the resulting pixel at that point is turned to the "ON" state. When the intensity of the corresponding area of the specimen is less than or equal to the intensity of the dithered value, the resulting pixel is turned to the "OFF" state.

Figure 5:
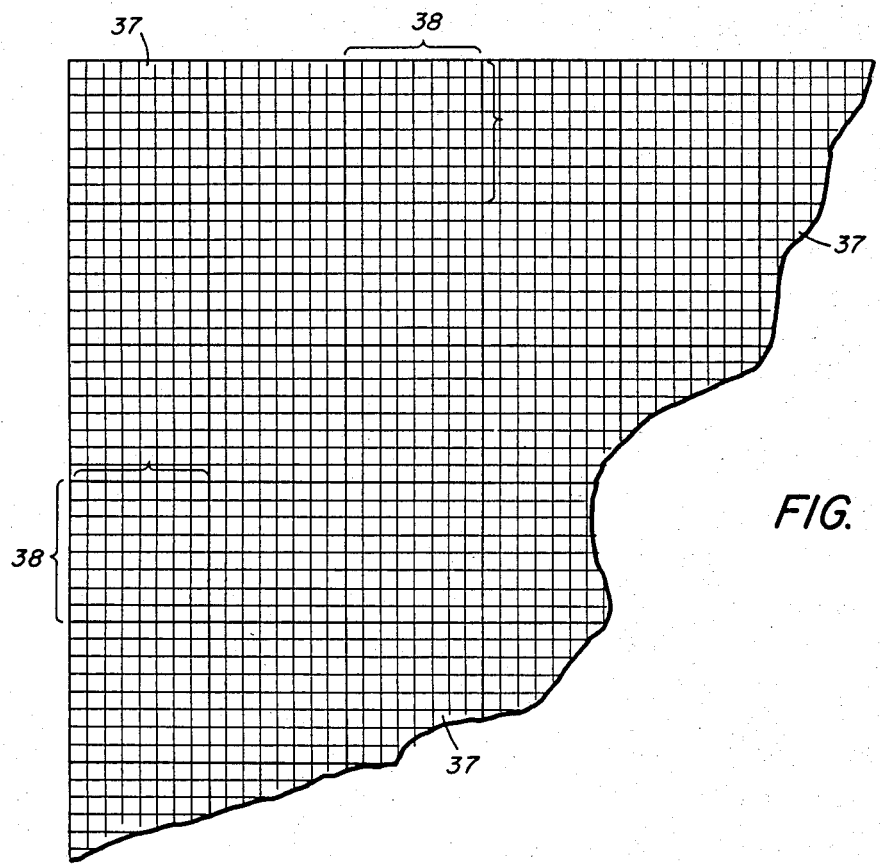
FIG. 5 is an example of a dithering matrix used in the dithering process.

A dithering matrix such as shown in FIG. 4 is used in the thresholding process. The matrix contains a pattern of threshold values to be used repeatedly until the thresholding process is complete. The values in the first or top horizontal row of the matrix are cyclically applied to the first row of pixels across the width of the image. The values in the second through eight rows are likewise cyclically applied to the pixels of the next seven rows. The entire process is repeated for the ninth through the sixteenth line and so forth until the entire image is dithered. The specimen is now in the form of digital, binary value pixels, such as shown in FIG. 5. The small squared 37 represent the pixel elements of an image and the larger cells 38 correspond to the region to which the 8×8 dither matrix of FIG. 4 was applied.

The image is digitized by the micro processor by assigning a binary number for each pixel. In the preferred embodiment a binary digit "1" signifies that the pixel is turned on, while "0" signifies that the pixel is off. The digitized image can be stored in a memory 36 of CPU or console 15.

Once the imaging process is complete and, the image stored, the user may "edit" the image by giving the system a series of commands from keyboard 14. The image may be displayed on screen 18, or printed on printer 13.

Figure 6:
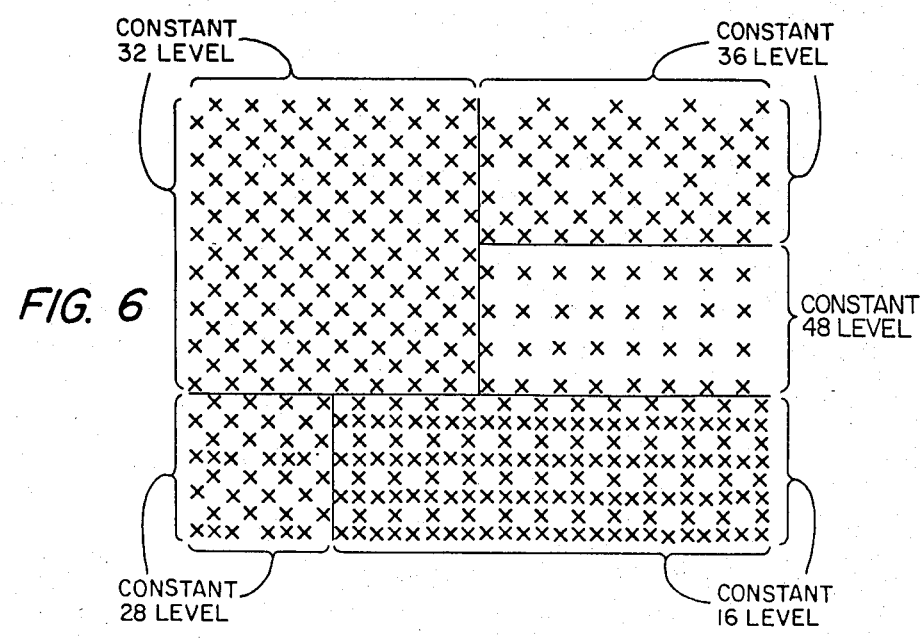
FIG. 6 is a sample of a small area of pixels representing a portion of the specimen to be digitized in FIG. 1, and shows regions with constant levels of brightness.

FIG. 6 illustrates an example of a small area or region of a dithered image made of a specimen 20, having constant brightness where an 8×8 dithering matrix is used, which includes 64 levels of brightness. Constant level 48 level is defined to mean a level of brightness representing 48/64 of the highest level of brightness, with 0 representing the darkest of dark and 63 representing the lightest of light. Obviously, the brightness levels of pixels coming from camera or scanner 12 may vary, for example, from 0 to 255, or some other image selected for a given system design.

Constant 16 level is defined as a level of brightness which is 16/64 of the highest level of brightness. Constant level 32 is defined as 32/64 of the highest level of brightness or an area with intermediate brightness. FIGS. 7a, 7b and 7c, respectively, show examples of dithered images with constant levels 48, 16 and 32. FIGS. 8a, 8b and 8c show binary representatives of the examples in FIG. 7. The "X" symbols indicate the "ON" state for the pixel at the spatial position at which it appears.

As can be seen from FIGS. 8a and 8b, long strings of identical bits appear in the case of constant level 16 and constant level 48. The strings can be replaced by a code using Huffman's run-length encoding, for example, which greatly reduces the space requirement for the images. On the other hand, no strings of identical bits appear in the constant level 32 case; therefore, run-length encoding cannot be used effectively. It is observed that regions near the medium brightness levels (grey scale regions) are not conducive to run-length encoding and that the closer an area is to medium brightness the fewer strings of identical bits are produced.

The present invention solves the problem by employing differentiation to place the dithered images in a form conducive to run-length encoding. The differentiation is done on a line by line basis with the first byte in each line left unchanged. Every byte in the line is compared with the reference byte (the byte left unchanged) and is replaced by the derivative of the byte with respect to the reference.

The preferred embodiment employs at least one exclusive OR (XOR) logic gate or the equivalent logical operator to accomplish differentiation. The nature of the XOR gate is such that it gives an output only when the two inputs are different.

FIGS. 9a, 9b and 9c, respectively, are differentiated for intermediate data corresponding to the data in FIGS. 8a, 8b and 8c. As can be seen by FIGS. 9a, 9b and 9c, long strings of identical bits are produced even for the difficult 32 level case. The data is now in an intermediate state suited for Huffman run-length encoding and subsequent storage in a minimum of storage space.

Referring to FIGS. 2 and 3, during the retrieval process, the stored data (now in a compressed form) is decoded by means 34b and is integrated by differentiation means 34a. The integrated data is placed into the bit map memory 32 and is the same as its original form. Integration is accomplished by again using the XOR gate on a line by line basis, in the same manner as for differentiation. The effect is complete restoration of the pre-compressed data of FIGS. 8a, 8b, and 8c, as clearly shown by applying the XOR function in the prescribed fashion to the data in FIGS. 9a, 9b, and 9c.

I claim:

1. A method for data compression of binary bits representing the pixels of a dithered image in a digital imaging process comprising the steps of
    in every scan line of pixels, differentiating between corresponding bits of bytes from a specified reference byte located in the scan line to be used unchanged in each differentiation and every other byte in the scan line to generate intermediate image data representing said dithered image, the original state of said reference byte being included in said imtermediate image data and
    encoding said intermediate image data.

2. The method for data compression in claim 1 wherein said differentiating is accomplished by using a logical operator.

3. The method for data compression in claim 2 wherein said operator is the Exclusive OR.

4. The method for data compression in claim 1 wherein said encoding step comprises
    encoding said intermediate image data using Huffman run-length encoding.

5. The method for data compression in claim 1 wherein the number of bits in each byte equals the number of bits in each line of the dithering pattern used in dithering.

6. The method for data compression in claim 1 further comprising the step of
    storing said encoded group lengths.

7. The method for data compression in claim 1 further comprising the steps of
    storing said encoded group lengths and
    retrieving said stored, encoded group lengths.

8. The method for data compression in claim 1 further comprising the steps of
    storing said encoded group lengths,
    retrieving said stored, encoded group lengths and
    decoding said retrieved, encoded group lengths.

9. The method for data compression in claim 1 further comprising the steps of
    storing said encoded group lengths,
    retrieving said stored, enoded group lengths,
    decoding said retrieved, encoded group lengths and
    in every scan line of pixels, differentiating between corresponding bits of bytes from the reference byte of the scan line and every other byte of the retrieved bits, while leaving the reference byte unchanged, and obtaining bits representing the original scan line.

10. The method for data compression in claim 9 wherein said differentiating is accomplished by using a logical operator.

11. The method for data compression in claim 10 wherein said operator is the Exclusive OR.

12. An apparatus for data compression of binary bits representing the pixels of a dithered image in a digital imaging process comprising
    in every scan line of pixels, means for differentiating between corresponding bits of bytes from a specified reference byte located in the scan line to be used unchanged in each differentiation and every other byte in the scan line to generate intermediate image data representing said dithered image, the original state of said reference byte being included in said intermediate image data and
    means for encoding said intermediate image data.

13. The apparatus for data compression in claim 12 wherein said differentiating means comprises at least one logic gate means.

14. The apparatus for data compression in claim 13 wherein said logic gate is the Exclusive OR means.

15. The apparatus for data compression in claim 12 wherein said encoding means comprises
    means for encoding said intermediate image data using Huffman run-length encoding.

16. The apparatus for data compression in claim 12 wherein the number of bits in each byte equals the number of bits in each line of the dithering pattern used in dithering.

17. The apparatus for data compression in claim 12 further comprising
 means for storing said encoded group lengths.

18. The apparatus for data compression in claim 12 further comprising
 means for storing said encoded group lengths and
 means for retrieving said stored, encoded group lengths.

19. The apparatus for data compression in claim 12 further comprising
 means for storing said encoded group lengths,
 means for retrieving said stored, encoded group lengths and
 means for decoding said retrieved, encoded group lengths.

20. The apparatus for date compression in claim 12 further comprising
 means for storing said encoded group lengths,
 means for retrieving said stored, encoded group lengths,
 means for decoding said retrieved, encoded group lengths and
 in every scan line of pixels, means for differentiating between corresponding bits of bytes from said reference byte of the scan line and every other byte of the retrieved bits, while leaving the reference byte unchanged, to obtain bits representing the original scan line.

21. The apparatus for data compression in claim 20 wherein said differentiating means comprises at least one logic gate.

22. The apparatus for data compression in claim 21 wherein said logic gate is the Exclusive OR.

* * * * *